United States Patent [19]
Snyder

[11] Patent Number: 6,131,235
[45] Date of Patent: Oct. 17, 2000

[54] ADJUSTABLE BRUSH HOLDER FOR WEB CLEANING SYSTEMS

[75] Inventor: Richard D. Snyder, East Greenville, Pa.

[73] Assignee: Illinois Tool Works Inc., Wilmington, Del.

[21] Appl. No.: 09/337,055

[22] Filed: Jun. 21, 1999

Related U.S. Application Data

[60] Provisional application No. 60/095,275, Aug. 4, 1998.

[51] Int. Cl.$^7$ ..................................................... A47L 5/38
[52] U.S. Cl. ............................... 15/308; 15/309.1; 15/398
[58] Field of Search .................................. 15/308, 309.1, 15/371, 398, 77, 88.1, 256.5

[56] References Cited

U.S. PATENT DOCUMENTS

| | | | |
|---|---|---|---|
| 478,093 | 7/1892 | Derham | 15/159.1 |
| 1,857,808 | 5/1932 | Diederichs | 15/256.5 |
| 3,085,268 | 4/1963 | Proulx | 15/21.1 |
| 3,229,661 | 1/1966 | Shelton | 118/122 |
| 3,377,644 | 4/1968 | Budzinski et al. | 15/256.5 |
| 3,434,273 | 3/1969 | Lovell | 57/300 |
| 3,745,602 | 7/1973 | Beistle | 15/308 |
| 3,878,578 | 4/1975 | Skudrna | 15/100 |
| 4,734,580 | 3/1988 | Rodrigo et al. | 250/324 |
| 5,483,323 | 1/1996 | Matsuda et al. | 399/175 |
| 5,566,420 | 10/1996 | Specht | 15/256.5 |
| 5,568,243 | 10/1996 | Durfee et al. | 399/98 |
| 5,746,302 | 5/1998 | Bowman | 15/256.5 |

OTHER PUBLICATIONS

Herbert Static Control—Facts You Should Know About Static—An Introduction to the Physical Basis of Static Electricity—Apr. 1995.

Herbert Static Control—ION–O–VAC MK IV Systems For Sheet and Web Cleaning—Static Nuetralizers, Rotary and Fixed Brushes and High Velocity Suction—Apr. 1997.

Herbert Static Control—ION–O–VAC MK I Systems For Sheet and Web Cleaning—Static Nuetralizer, Fixed Brushes and High Velocity Suction—Jul. 1997.

SIMCO 1998–1999 Industrial Product Catalog p. 28—Nuetro–Vac Web Cleaning Systems.

*Primary Examiner*—Theresa T. Snider
*Attorney, Agent, or Firm*—Volpe and Koening, P.C.

[57] ABSTRACT

A brush carrier assembly of the type generally associated with a vacuum hood as part of a vacuum cleaning system used with a moving web is disclosed. The brush carrier utilizes a fixed portion and a movable portion which are adjustable relative to each other by location of a fastening member which adjusts the tension on a biasing member for separating the fixed and movable portions.

7 Claims, 2 Drawing Sheets

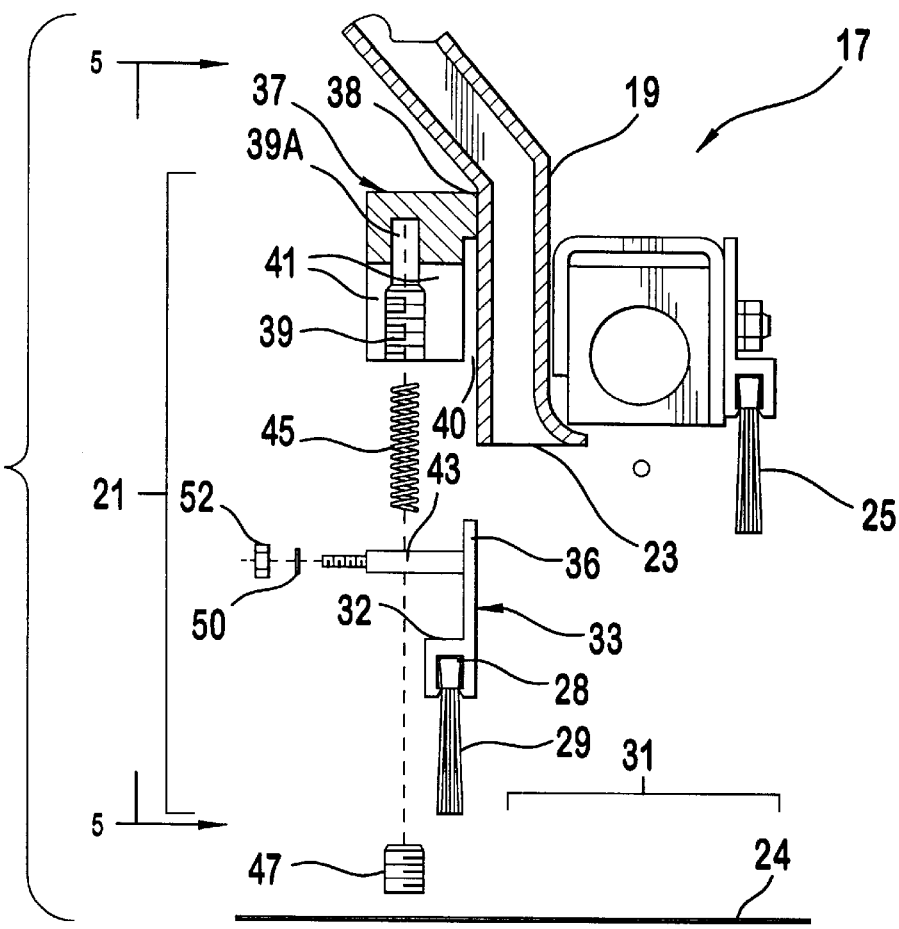
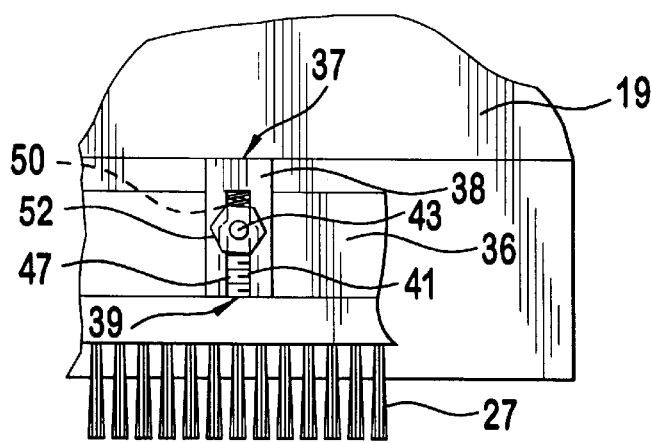

ADJUSTABLE BRUSH HOLDER FOR WEB CLEANING SYSTEMS

This application claims the benefit of U.S. Provisional application No. 60/095,275 filed Aug. 4, 1998.

BACKGROUND OF THE INVENTION

1. Field of the Invention

The present invention relates generally to vacuum cleaning systems used with a moving web. More specifically, the invention relates to a vacuum cleaning system that includes agitation and static dissipating brush assemblies. Most specifically, the invention relates to a web cleaning system that includes an easily adjustable brush assembly that is biased toward the web surface.

2. Description of Prior Art

A common problem experienced in the converting and graphic arts industries is the attraction of dust and dirt to a moving web as it is processed. These industries rely heavily upon machinery that utilizes variable width webs, from six to one hundred and forty-four (61–44) inches, moving at speeds that may exceed two thousand (2000) feet per minute. The accumulation of dust and dirt is exacerbated by the accumulation of static electricity on the web. Static charge build-up is a recognized problem in these industries and is particularly troublesome in those operations where contaminants cause blemishes on the finished surface.

It is known to use web cleaning systems, with or without static neutralization, to remove particles from the surface prior to processing. Prior art cleaning systems including a collection manifold with a vacuum slot running the width of the web to vacuum away settled particulates are known. To aid in this removal, rows of parallel brushes span the width of the moving web in close proximity to the vacuum slot. The brushes agitate and dislodge the settled particulates which are vacuumed away. Depending upon the material composition of the brush, web-born static can be drained off or grounded to earth.

Brushes that perform static draining or agitation functions require frequent adjustment in order to maintain contact with the surface. Prior art adjustment methods have relied on mechanically mounted brush holders that only permitted course adjustments. These prior art methods often resulted in misalignment and uneven pressure as the mechanical holding means, generally screws or bolts, frequently did not address the need for easy and precise adjustment.

It is an object of the present invention to provide an improved means of adjusting the brushes.

SUMMARY OF THE INVENTION

The present invention provides a brush carrier assembly of the type generally associated with a vacuum hood as part of a vacuum cleaning system used with a moving web. The brush carrier has a simplified and improved means of adjusting the position of the brush relative to the moving web.

In one embodiment, the brush carrier comprises a first portion which is attached to the hood at one end thereof and is then spaced from the hood so as to form a slot between the hood and the fixed portion. The fixed portion includes a bore for receiving a biasing means and a slot for receiving a cross member attached to the brush carrier. The brush carrier includes at least one wall which is dimensioned to be disposed between the fixed portion in the hood with the cross member extending from one end thereof through the slot in the fixed member and the other end supporting a dependent brush. The fastening means is provided for adjusting the position of the cross member against the biasing means in the fixed portion. By adjustment of the fastening means, the tension on the biasing means may be increased or decreased as necessary to adjust the height of the brush relative to the moving web.

In another embodiment, the brush carrier forms a U-shaped channel which receives the free end of the fixed portion and has multiple depending brushes.

BRIEF DESCRIPTION OF THE DRAWINGS

FIG. 4 is an exploded view of a brush holder in accordance with a second embodiment of the present invention.

FIG. 5 is a fragmentary view of an assembled brush holder taken in the direction of the line 3—3 of FIG. 4.

DETAILED DESCRIPTION OF A PREFERRED EMBODIMENT

Figure 1:
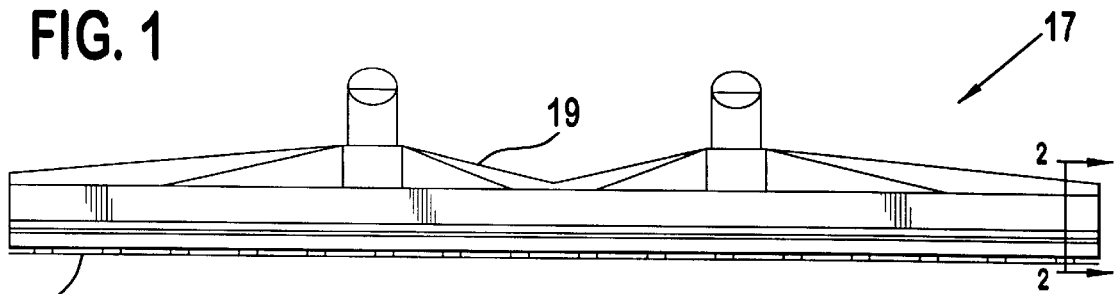
FIG. 1 is a front elevation of a web cleaning system with a brush holder in accordance with the present invention.

The following description will be made reference to the drawing figures wherein like numerals represent like elements throughout.

Figure 2:
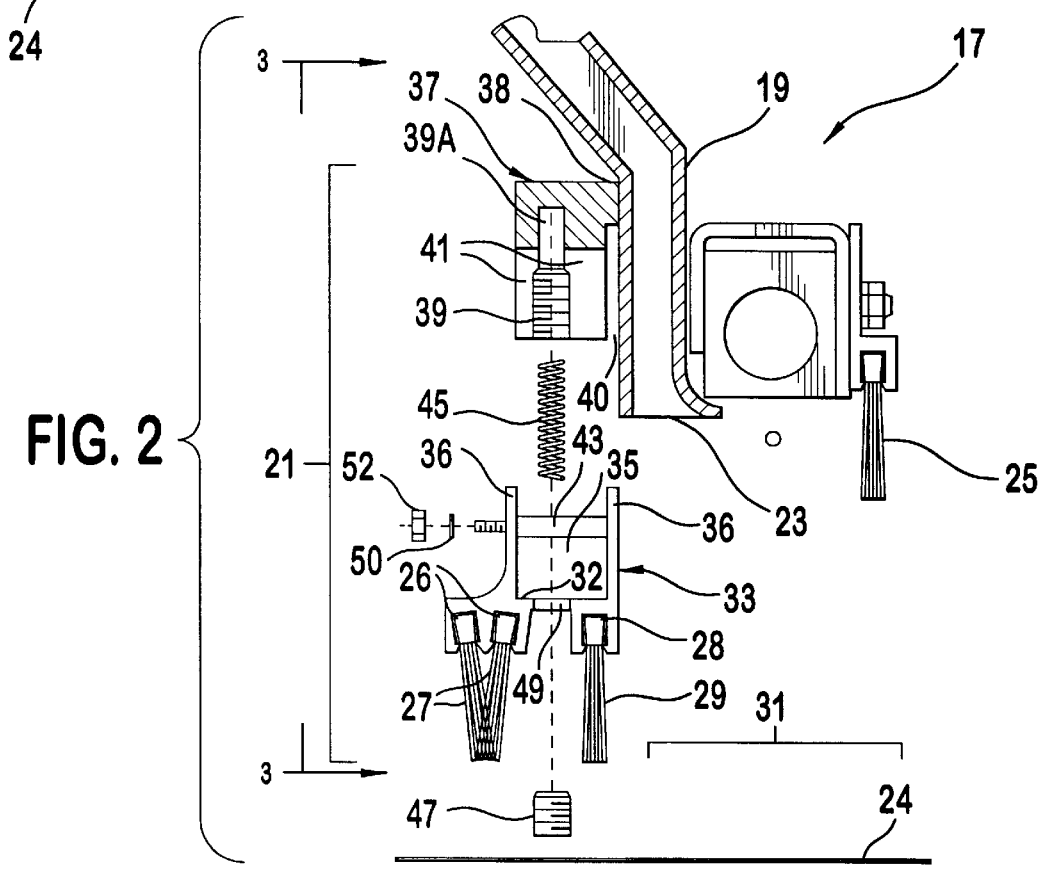
FIG. 2 is an exploded section of a brush holder taken along line 2—2 of FIG. 1.
Figure 3:
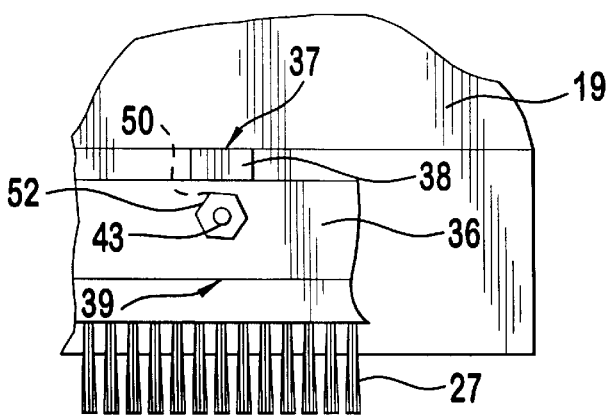
FIG. 3 is a fragmentary view of an assembled brush holder taken in the direction of the line 3—3 of FIG. 2.

As shown in FIG. 1, the web vacuum cleaning system 17 includes a vacuum hood 19 which is suspended in close proximity to the web 24. As is shown in FIG. 2, an adjustable brush holder assembly 21 is located on one side of vacuum slot 23 and an air sealing brush 25 is located on the opposite side of vacuum slot 23. Brush holder 21 includes agitation brushes 27 and static drain brush 29. The brushes 25, 27 and 29 run the entire length of the hood and flank the vacuum slot 23. As such, they define a region 31 of negative air pressure across the width of the moving web 24.

With reference to FIG. 2, the brush carrier 33 carries agitation brushes 27 and static drain brush 29 for removing particles or accumulated static from the web 24. In the preferred embodiment, there are two agitation brushes 27 and one static drain brash 29. It is contemplated that more or fewer brushes can be used in accordance with the specific application. The agitation brushes 27 are preferably nylon and the static drain brush 29 is preferably of nylon and electrically conductive fibers, such as carbon fiber. Suitable brushes are available from the SEALEZE Corp. of Richmond, Va. as as Part Nos. 4671436; 4671468; and 4671471. The brush carrier 33 is preferably an aluminum extrusion which is shown as having a central channel 35 defined by the walls 36 and the base 32. Beneath the base 32, there are three slots for receiving brushes. Brush receiving slots 26 are preferably angled slightly from parallel center lines so as to direct the brushes 27 toward each other. Brush slot 28 is generally normal to the base 32 and will dispose the brush 29 in a vertical orientation.

The channel 35 is dimensioned to receive a plurality of mounting blocks 37 with only sufficient clearance to permit the mounting blocks 37 vertical movement within the channel 35 without binding. Each mounting block 37 has an extension 38 at the upper end for attachment to the vacuum hood at a distance that is sufficient to provide a slot 40 between the vacuum hood 19 and the lower end of the mounting block 37. In the preferred embodiment, the mounting blocks 37 and the vacuum hood 19 are electrically conductive material and form a path to ground through any one of a number of mounting arrangements, not shown, which will be known to those skilled in the art. The extension 38 of the mounting block 37 is preferably attached to the vacuum hood 19 by welding or other fixed attachment means. Each of the mounting blocks 37 is attached to the hood 19 so that the lower dependent ends thereof lie in a common horizontal plane and the slots 40 lie in a common vertical plane.

As can be seen with reference to FIG. 2, each mounting block contains a threaded bore 39 that extends inwardly from the free end thereof for predetermined distance and a smaller diameter, smooth bore 39A. The bores 39 and 39A are on common centerline and are dimensioned to received a biasing member, such as the compression spring 45, as will be explained hereinafter. Each mounting block 37 will include a slot 41 which runs from the free end thereof up to and adjacent to smooth bore 39A. Slot 41 is positioned in the mounting block 37 so that its centerline lies on a diameter of the bores 39. Slot 41 is sized to just accommodate the pin 43 which extends between the walls 36 of brush carrier 33. The slot 41 and the pin 43 are carefully dimensioned so as to permit vertical movement of the pin 43 in the slot 41 without rotation or racking of the brush carrier 33.

During assembly of the preferred embodiment, the compression spring 45 is disposed in the bores 39 and 39A so that one end thereof nest in the bore 39A. The brush carrier is then placed over the free end of the mounting block 37 so that the pin 43 will be in contact with the biasing spring 45. Although it is not believed to be necessary, the pin 43 may configured to provide an actual seat for the biasing means 45. In the preferred embodiment, biasing means 45 is sufficiently captured within the bores 39 and 39A and an additional spring seat is not required. To complete the assembly, the brush carrier is pushed toward the fixed end, i.e. the extension 38, of the mounting blocks 37 with sufficient force to compress the biasing spring 45. Once the brush carrier 33 is in a desired position and the biasing spring 45 has been compressed, a set screw 47 is inserted through the aperture 49 in base 32 and engages the threads of threaded bore 39. The set screw 47 limits the travel or displacement of the brush carrier by adjusting the tension on the biasing spring 45. By increasing or decreasing the turns of the set screw 47, one can adjust the placement of the brush carrier with respect to the web surface 24. A washer 50 and locking means 52 are affixed to the threaded end of pin 43 as an additional means of securing the brush holder 33.

The number of mounting blocks 37, biasing springs 45 and pins 43 in any particular application will be dependent upon the width of the web cleaning system 17. In the preferred embodiment, there are five mounting blocks over a length of One-Hundred Forty Four (144) inches. A preferred biasing means is a compression spring formed of music wire having a diameter of 0.022 inches and a free length of 0.8125 inches with thirteen (13) active coils. Such a spring is available from Lee Associated Spring as Part No. CO180-022 0810.

In the preferred embodiment, compression springs were chosen because of the relative uniformity of force available, however, other biasing means, such as leaf springs, may be used if they are configured to provide the uniformity.

Since the brush carrier 33 accommodates a plurality of brushes, its adjustment is typically more difficult than that associated with the air sealing brush 25. However, the adjustment system of the present invention may be utilized with the single air sealing brush 25 if the ease of adjustability and accuracy of the present invention is desired in that position.

In the embodiment illustrated in FIGS. 4 and 5, the brush carrier 33 has only a single side wall 36 and a single brush 29. In accordance with this embodiment, the brush carrier 33 is provided with a cross member or pin 43 as previously described. However, the base 32 of the brush carrier 33 does not extend into the path of the fastener 47 so that no passage through the base 32 is required in this embodiment. Single brush carriers suitable for modification for use in accordance with this embodiment of the invention are available from the SEALEZE Corp. of Richmond, Va. As with the prior embodiment, the vertical wall 36 will be received in the slot 40 between the free end of nesting block 37 and the hood 19, and the brush 29 is adjusted relative to the web 24 by positioning the fastening means 47 in the threaded bore 39. The washer 50 and locking means 52 are as previously described.

As can be seen in FIG. 5, the nesting block is positioned on the outside of wall 36. In all other respects, the single brush embodiment will function as described for the prior embodiment.

What is claimed is:

1. A brush carrier assembly of a type associated with a vacuum hood which forms part of a vacuum cleaning system used with a moving web, the brush carrier assembly characterized by:

a mounting block having a first end adapted for attachment to the hood and a second free end which defines interior and exterior surfaces of a predetermined length, with the interior surface being recessed from the hood for a predetermined depth; the free end further having a slot between the surfaces and a fastener receiving recess, both extending toward the first end;

a movable portion having at least one side wall, dimensioned to be received in the recess between the mounting block and the hood, having upper and lower edges, at least one brush receiving channel defined at the lower edge thereof and at least one cross member affixed adjacent to and perpendicular to the upper edge and dimensioned to be received in the slot;

a biasing means located in the slot between the first end and the cross member; and a fastening means that engages with the mounting block for selectively compressing the biasing means.

2. The brush carrier assembly of claim 1 further characterized by:

the moveable portion having two side walls which are spaced apart to define a channel that receives the free end of the mounting block and the cross member extends between the side walls.

3. The brush carrier assembly of claim 2 further characterized by:

a base which extends between the side walls at a position adjacent to the brush receiving recess and defines at least one through passage for the fastening means.

4. The brush carrier assembly of claim 1 further characterized by:

the biasing means being a compression spring.

5. The brush carrier assembly of claim 1 further characterized by:

the slot and fastener receiving recess being positioned about a common center line.

6. A brush carrier assembly of a type associated with a vacuum hood which forms part of a vacuum cleaning system used with a moving web, the brush carrier assembly characterized by:

a fixed portion having a first end attached to the hood and a second free end which is spaced from the hood as a dependent projection, a bore extends in from the free end for a predetermined length, and a portion of the bore is configured to receive a fastening means, a predetermined length, and a portion of the bore is configured to receive a fastening means, the free end further including a slot which extends in from the free end and is co-extensive with at least a portion of the bore;

a biasing member which is dimensioned to be received within the bore; and a brush carrier having spaced apart side walls and a base therebetween to define a channel that receives the free end of the fixed portion with at least one side wall disposed between the free end of the fixed portion and the hood, the brush carrier further includes a pin which extends between the side walls and is dimensioned to be received within the slot, the base of the brush carrier has an aperture on centerline with the bore in the fixed portion and at least two brushes depend therefrom;

whereby the assembled brush carrier has the biasing member in the bore of the fixed portion, the free end of the fixed portion mated in the channel, the pin located in the slot with the biasing member compressed and a fastening means inserted through the aperture and engaged with the bore.

7. A brush carrier assembly of a type associated with a vacuum hood which forms part of a vacuum cleaning system used with a moving web, the brush carrier assembly characterized by:

a fixed portion having a first end for attachment to the hood and a second free end which is spaced from the hood as a dependent projection, a bore extends in from the free end for a predetermined length with a portion of the bore configured to receive a fastening means, the free end further including a slot which extends in from the free end and is co-extensive with at least a portion of the bore;

a biasing member which is received within the bore; and a brush carrier having spaced apart side walls and a base therebetween to define a channel that receives the free end of the fixed portion with at least one side wall disposed between the free end of the fixed portion and the hood, and the base defines an aperture on centerline with the bore, the brush carrier further includes a pin which extends between the side walls and is received within the slot and at least two brushes that depend therefrom; and a fastening means passed through the aperture and engaged with the configured portion of the bore for selectively compressing the biasing member.

* * * * *

UNITED STATES PATENT AND TRADEMARK OFFICE
CERTIFICATE OF CORRECTION

PATENT NO : 6,131,235
DATED : October 17, 2000
INVENTOR(S) : Richard D. Snyder

It is certified that error appears in the above-identified patent and that said Letters Patent are hereby corrected as shown below:

In claim 3, at column 4, line 55, delete "recess" and insert --channel-- therefor.

In claim 6, at column 5, lines 5-7, delete "a predetermined length, and a portion of the bore is configured to receive a fastening means,".

Signed and Sealed this

Eighth Day of May, 2001

*Attest:*

NICHOLAS P. GODICI

*Attesting Officer*  *Acting Director of the United States Patent and Trademark Office*